United States Patent
Guo et al.

(10) Patent No.: US 11,189,882 B2
(45) Date of Patent: Nov. 30, 2021

(54) LITHIUM ION BATTERY SEPARATOR MANUFACTURED FROM COMPOSITE FIBERS COMPOSED OF POLYPROPYLENE CORE AND ALKALI-SOLUBLE POLYESTER WITH POLYETHYLENE SKIN AND MANUFACTURING METHOD OF THE SAME

(71) Applicant: GUANGDONG MODERN HIGH-TECH FIBER CO., LTD., Guangdong (CN)

(72) Inventors: Qinghai Guo, Guangdong (CN); Jianping Jiang, Guangdong (CN); Renqi Guo, Guangdong (CN)

(*) Notice: Subject to any disclaimer, the term of this patent is extended or adjusted under 35 U.S.C. 154(b) by 155 days.

(21) Appl. No.: 16/499,785

(22) PCT Filed: Jun. 8, 2018

(86) PCT No.: PCT/CN2018/090399
§ 371 (c)(1),
(2) Date: Sep. 30, 2019

(87) PCT Pub. No.: WO2019/169774
PCT Pub. Date: Sep. 12, 2019

(65) Prior Publication Data
US 2020/0035970 A1    Jan. 30, 2020

(30) Foreign Application Priority Data

Mar. 8, 2018  (CN) .................. 201810190524.X

(51) Int. Cl.
*H01M 50/44*    (2021.01)
*D01D 5/34*    (2006.01)
(Continued)

(52) U.S. Cl.
CPC .............. *H01M 50/44* (2021.01); *D01D 5/34* (2013.01); *D01F 8/06* (2013.01); *D01F 8/14* (2013.01);
(Continued)

(58) Field of Classification Search
CPC .. H01M 50/44; H01M 50/403; H01M 50/449; H01M 50/411; D01D 5/34; D01F 8/06; D01F 8/14
(Continued)

(56) References Cited

FOREIGN PATENT DOCUMENTS

| CN | 202247120 U | 5/2012 |
|---|---|---|
| CN | 202888297 U | 4/2013 |

(Continued)

*Primary Examiner* — Sean P Cullen

(57) ABSTRACT

The present invention relates to a new lithium ion battery separator and a manufacturing method therefor, composite fine-denier POY fibers with polypropylene PP acting as a core and alkali-soluble polyester COPET and polyethylene PE acting as a skin are produced by means of a chemical fiber composite spinning technology, wherein the COPET and PE are distributed as an islands-in-the-sea form, then the POY fibers are arranged as a fabric with a certain breadth by means of beam-warping, the fabric is subjected to stretching and hot-pressing by a hot roll such that the PE component having a low melting point is melted and joined to form a film, and then the COPET is dissolved away by means of an alkali solution such that a place where the COPET is present in the film become pores and PP fibers become the skeleton of the film, thus forming a lithium ion battery separator.

2 Claims, 2 Drawing Sheets

(51) Int. Cl.
*D01F 8/06* (2006.01)
*D01F 8/14* (2006.01)
*H01M 10/0525* (2010.01)
*H01M 50/411* (2021.01)
*H01M 50/403* (2021.01)
*H01M 50/449* (2021.01)

(52) U.S. Cl.
CPC ..... *H01M 10/0525* (2013.01); *H01M 50/403* (2021.01); *H01M 50/411* (2021.01); *H01M 50/449* (2021.01)

(58) Field of Classification Search
USPC ....................................................... 429/254
See application file for complete search history.

(56) References Cited

FOREIGN PATENT DOCUMENTS

| | | | |
|---|---|---|---|
| CN | 103137931 A | | 6/2013 |
| CN | 104157812 A | | 11/2014 |
| CN | 204488153 U | * | 7/2015 |
| JP | 2002088635 A | | 3/2002 |
| JP | 2006169665 A | * | 6/2006 |

* cited by examiner

LITHIUM ION BATTERY SEPARATOR MANUFACTURED FROM COMPOSITE FIBERS COMPOSED OF POLYPROPYLENE CORE AND ALKALI-SOLUBLE POLYESTER WITH POLYETHYLENE SKIN AND MANUFACTURING METHOD OF THE SAME

FIELD OF THE INVENTION

The invention belongs to the technical field of lithium ion battery separators, and particularly relates to a novel lithium ion battery separator and a manufacturing method thereof.

BACKGROUND OF THE INVENTION

A separator is one of the key inner-layer components in the structure of a lithium-ion battery. The separator can isolate a positive electrode from a negative electrode of the battery to prevent short circuiting, and can also block current conduction in the battery by means of a pore-closing function when the battery is overheated. The performance of the separator defines an interface structure and internal resistance and the like of the battery, and directly affects the capacity, cycle performance and safety performance of the battery, so a separator with excellent performance plays an important role in improving the overall performance of the battery. High-end separator materials, especially separator materials for power lithium-ion batteries, have extremely high requirements on product consistency, and also have high requirements on the uniformity of the size and distribution of separator micropores in addition to the basic requirements on the thickness, surface density and mechanical properties. After more than ten years of development, the separator technologies in China have gradually narrowed the gap with foreign high-end technologies. However, there are still many problems in terms of the requirements on processes and products. For example, the separator has an insufficient strength, uneven pores, poor resistance to high temperature, etc. With the popularization of new energy electric vehicles in the future and the ever-increasing trend of replacing other energy sources with electricity, whether the development of lithium-ion battery separators can keep up with the needs of social development has become a difficult problem and challenge for industrial development.

The invention relates to a lithium ion battery separator and a manufacturing method thereof, and aims to provide a method for manufacturing a separator having a higher strength and more uniform pores. That is, multi-component composite fine-denier POY fibers of PP, PE and COPET are produced by a spinning process. The POY fibers are formed as a fabric with a certain breadth by means of beam-warping, the fabric is then subjected to hot-pressing and stretching by a hot roll such that PE fibers having a low melting point are melted into a film, the COPET is then dissolved away by an alkali solution to form pores, and PP fibers become the skeleton of the film, thus finally forming a lithium ion battery separator having a high strength, uniform pores and a moderate thickness, which can be suitable for practical applications.

SUMMARY OF THE INVENTION

The invention aims to provide a novel lithium ion battery separator and a manufacturing method thereof, and aims to provide a method for manufacturing a separator having a higher strength and more uniform pores.

The lithium ion battery separator according to the invention is characterized in that: composite fine-denier POY fibers with polypropylene PP acting as a core and alkali-soluble polyester COPET and polyethylene PE acting as a skin are produced by means of a chemical fiber composite spinning technology, wherein the COPET and PE are distributed as an islands-in-the-sea form, with the COPET being islands and the PE being the sea, then the POY fibers are arranged as a fabric with a certain breadth by means of beam-warping, the fabric is subjected to stretching and hot-pressing by a hot roll such that the PE component having a lower melting point is melted and joined to form a film, while the PP and COPET components having higher melting points are formed as a lot of tiny fibers evenly distributed in the PE film, and then the COPET is dissolved away by means of an alkali solution such that a place where the COPET is present in the film become pores and PP fibers become the skeleton of the film, thus finally forming the lithium ion battery separator.

The manufacturing method of the lithium ion battery separator according to the invention further comprises the following steps:

(1) composite fine-denier POY fibers with polypropylene PP acting as a core and alkali-soluble polyester COPET and polyethylene PE acting as a skin are produced by means of a hot melt spinning technology combined with a composite spinning assembly, the COPET and PE being distributed as an islands-in-the-sea form, thus obtaining multi-component composite fine-denier POY fibers comprising multifilaments having a denier of 10-20 and monofilaments having a denier of 1-2, wherein the PP accounts for 5-10 wt %, the COPET accounts for 40-45 wt % and the rest is the PE;

(2) the composite POY fibers are formed as a fabric with a certain breadth by means of beam-warping according to actual needs;

(3) the fabric is subjected to stretching by a hot roll such that the components of the POY fibers are separated due to the difference in component materials, wherein the PP and COPET are formed as ultrafine-denier fibers having very small monofilaments, PP fibers are controlled at 0.05-0.2 denier, and COPET fibers are controlled at 0.01-0.02 denier;

(4) the fabric is further subjected to pressing by a hot roll at 120-122° C. such that the PE is melted into a film, while the COPET is formed as a lot of tiny random fibers evenly distributed in the film during stretching and hot pressing; and the thickness of the film is controlled by the denier value and stretching factor of multifilament fibers, and generally controlled at 38-42 microns;

(5) the film is dissolved in 15 g/L sodium hydroxide as an alkali solution at a vaporization temperature of 105° C. for 10-15 min to dissolve away the COPET fibers, such that many randomly ordered pores with controllable sizes are formed on the film with size being controlled at 0.1-0.3 micron; while the PP is not affected by the alkali solution, and finally present in the film in the form of fibers to become the skeleton of the film, thus greatly enhancing the strength of the film; and (6) the resulting film is further subjected to oven drying and heat setting, and then winding to obtain a lithium ion battery separator having a higher strength, a moderate thickness, a smaller pore size and a better distribution.

In the invention, the PE component is high-density polyethylene HDPE (the model can be 52815, and the melting point is about 122° C.); the PP component is high bending modulus polypropylene (the model can be Z30S, and the melting point is about 165° C.); the COPET component is alkali-soluble polyester, (the model can be 6070, and the melting point is about 240° C.); and the composite spinning assembly is a commercially available product (from Changzhou Fangxing Mechanics Co., Ltd.).

In the invention, composite fine-denier POY fibers are produced by a chemical fiber composite spinning technology, the POY fibers are processed by means of beam-warping and formed as a film by hot pressing, and then COPET is dissolved away by an alkali solution, thus finally forming a lithium ion battery separator having a high strength, uniform pores and a moderate thickness, which can be suitable for practical applications. The advantages of the invention lie in that the thickness, strength and pores of the separator can be effectively controlled; furthermore, since the melting point of PE is about 120° C., the PE will be automatically melted when the battery fails and generates heat up to the melting point of PE, such that pores inside the film are closed and the battery automatically stops working to avoid safety hazards.

Figure 1:
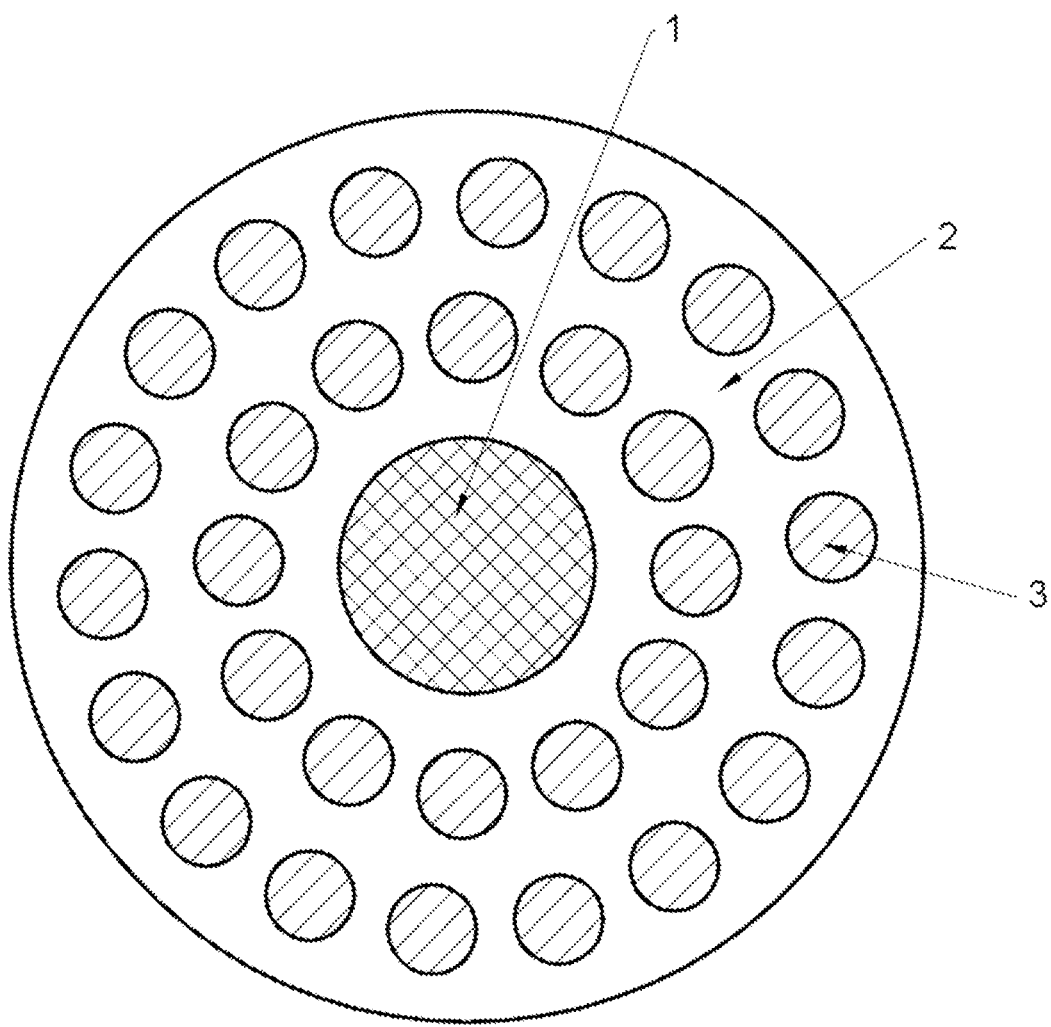
FIG. 1 is a schematic cross-sectional view of the structure of monofilament composite POY fibers.
Figure 2:
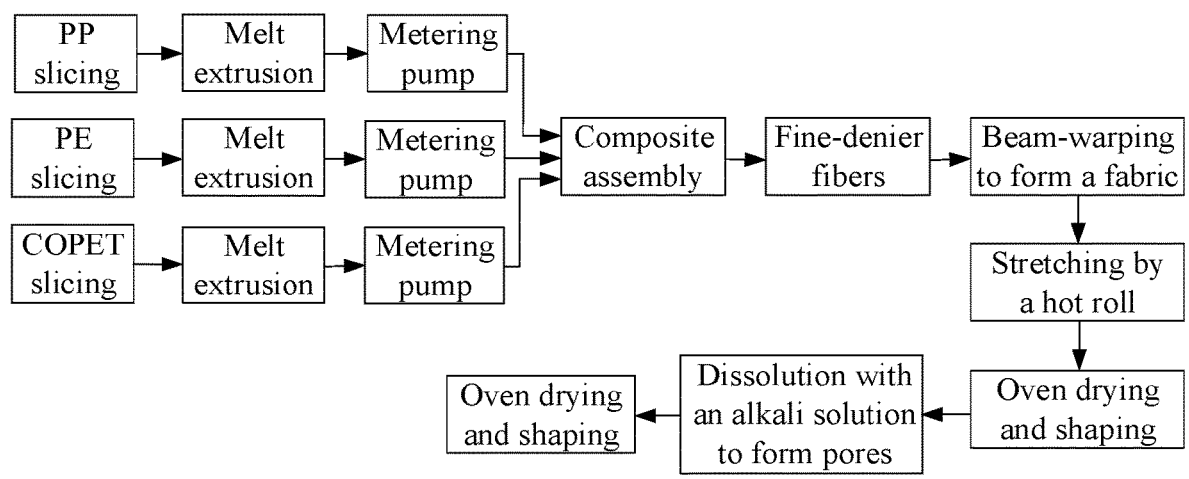
FIG. 2 is a schematic diagram of the process flow.

In the Figures, PP is indicated with 1, PE is indicated with 2 and COPET is indicated with 3.

DETAILED DESCRIPTION OF THE INVENTION

A lithium ion battery separator is characterized in that: composite fine-denier POY fibers with polypropylene PP acting as a core and alkali-soluble polyester COPET and polyethylene PE acting as a skin are produced by means of a chemical fiber composite spinning technology, wherein the COPET and PE are distributed as an islands-in-the-sea form, with the COPET being islands and the PE being the sea, then the POY fibers are arranged as a fabric with a certain breadth by means of beam-warping, the fabric is subjected to stretching and hot-pressing by a hot roll such that the PE component having a low melting point is melted and joined to form a film, while the PP and COPET components having higher melting points are formed as a lot of tiny fibers evenly distributed in the PE film, and then the COPET is dissolved away by means of an alkali solution such that a place where the COPET is present in the film become pores and PP fibers become the skeleton of the film, thus finally forming the lithium ion battery separator. A manufacturing method of the lithium ion battery separator comprises the following steps:

(1) multi-component composite fine-denier POY fibers comprising multifilaments having a denier of 10-20 and monofilaments having a denier of 1-2 are produced by means of a hot melt spinning technology combined with a composite spinning assembly (from Changzhou Fangxing Mechanics Co., Ltd.); wherein PP accounts for 5-10 wt %, COPET accounts for 40-45 wt % and the rest is PE, and the COPET fiber distribution should be as much as possible and the fiber denier should be as small as possible (generally controlled at 0.01-0.02) such that the COPET can be evenly distributed after pressing and stretching;

(2) the composite POY fibers are formed as a fabric with a certain breadth by means of beam-warping according to actual needs;

(3) the fabric is subjected to stretching by a hot roll such that the components of the POY fibers are separated due to the difference in component materials, wherein the PP and COPET are formed as ultrafine-denier fibers having very small monofilaments, PP fibers are controlled at 0.05-0.2 denier, and COPET fibers are controlled at 0.01-0.02 denier;

(4) the fabric is further subjected to pressing by a hot roll above 120° C. such that the PE is melted into a film, while the COPET is formed as a lot of tiny random fibers evenly distributed in the film during stretching and hot pressing; and the thickness of the film is controlled by the denier value and stretching factor of multifilament fibers, and generally controlled at about 40 microns;

(5) the film is dissolved in 15 g/L sodium hydroxide as an alkali solution at a vaporization temperature of 105° C. for about 10 min to dissolve away most of the COPET fibers, such that many randomly ordered pores with controllable sizes are formed on the film (the pore sizes are controlled at 0.1-0.3 micron); while the PP and PE are not affected by the alkali solution, and finally the PP is present in the film in the form of fibers to become the skeleton of the film, thus greatly enhancing the strength of the film; and (6) the resulting film is further subjected to oven drying and heat setting, and then winding to obtain a lithium ion battery separator having a higher strength, a moderate thickness, a smaller pore size and a better distribution.

The invention claimed is:

1. A lithium ion battery separator, characterized in that:
   composite POY fibers with polypropylene PP acting as a core and alkali-soluble polyester COPET and polyethylene PE acting as a skin are produced by a chemical fiber composite spinning technology,
   wherein the COPET and PE are distributed as an islands-in-sea form,
   with the COPET being the islands and the PE being the sea,
   then the POY fibers are arranged as a fabric with a breadth by means of beam-warping,
   the fabric is subjected to stretching and pressing such that the PE having a lower melting point than the PP and the COPET is melted and joined to form a PE film,
   while the PP and the COPET having higher melting points than the PE are formed as fibers evenly distributed in the PE film, and
   then the COPET is dissolved away by means of an alkali solution such that a place where the COPET is present in the PE film become pores and the PP become a skeleton of the PE film,
   thus finally forming the lithium ion battery separator.

2. A manufacturing method of a lithium ion battery separator, comprising the following steps:
   (1) compositing POY fibers with polypropylene PP acting as a core and alkali-soluble polyester COPET and polyethylene PE acting as a skin by a chemical fiber composite spinning technology combined with a composite spinning assembly, the COPET and the PE being distributed as an islands-in-sea form, thus obtaining multi-component composite POY fibers comprising multifilaments having a denier of 10-20 and monofilaments having a denier of 1-2, wherein the PP accounts for 5-10 wt %, the COPET accounts for 40-45 wt % and the rest is the PE;
   (2) forming the composite POY fibers as a fabric with a breadth by means of beam-warping;
   (3) strectching the fabric such that components of the POY fibers are separated due to difference in component materials, wherein the PP and the COPET are formed as fibers having monofilaments at 0.05-0.2 denier and at 0.01-0.02 denier respectively;
   (4) pressing the fabric by a roll at 120-122° C. such that the PE is melted into a film, while the COPET is formed as random fibers evenly distributed in the film during the stretching and the pressing; and a thickness of the film is controlled by the denier value and stretching factor of multifilament fibers, and controlled at 38-42 microns;

(5) dissolving the film in 15 g/L sodium hydroxide as an alkali solution at a vaporization temperature of 105° C. for 10-15 min to dissolve away the COPET fibers, such that randomly ordered pores with controllable sizes are formed on the film with size being controlled at 0.1-0.3 micron; while the PP is not affected by the alkali solution, and finally present in the film in the form of fibers to become a skeleton of the film, thus enhancing a strength of the film; and (6) the resulting film is further subjected to oven drying and heat setting, and then winding to obtain a lithium ion battery separator.

\* \* \* \* \*